(12) United States Patent
Rayburn et al.

(10) Patent No.: US 8,677,623 B1
(45) Date of Patent: Mar. 25, 2014

(54) WHEEL TRIM ADAPTER

(75) Inventors: Jerry Rayburn, Murray, KY (US); John Samuel Coons, Murray, KY (US); Ron Jackson, Hazel, KY (US); Bobby Atkins, Murray, KY (US); Michael Rushing, Almo, KY (US)

(73) Assignee: J A E Enterprises, Inc., Almo, KY (US)

( * ) Notice: Subject to any disclaimer, the term of this patent is extended or adjusted under 35 U.S.C. 154(b) by 210 days.

(21) Appl. No.: 13/312,145

(22) Filed: Dec. 6, 2011

(51) Int. Cl.
*B21D 53/32* (2006.01)
*B21K 1/40* (2006.01)

(52) U.S. Cl.
USPC ............. 29/894.381; 29/894; 29/894.38; 301/37.102; 301/37.31; 301/37.372; 301/37.375; 301/108.4

(58) Field of Classification Search
USPC ............ 29/894, 894.38, 894.381; 301/37.31, 301/37.102, 108.1, 108.4, 37.372
See application file for complete search history.

(56) References Cited

U.S. PATENT DOCUMENTS

| | | | |
|---|---|---|---|
| 2,037,237 | A | 4/1936 | Horn |
| 3,202,460 | A | 8/1965 | Holbrow |
| 3,833,266 | A | 9/1974 | Lamme |
| 4,036,530 | A | 7/1977 | Reppert |
| 4,313,267 | A | 2/1982 | Alexy |
| 5,205,614 | A | 4/1993 | Wright |
| 5,294,189 | A | 3/1994 | Price et al. |
| 5,503,465 | A | 4/1996 | Price et al. |
| 5,645,324 | A | 7/1997 | Wright et al. |
| 6,443,680 | B1 | 9/2002 | Bodin |
| 6,485,107 | B2 | 11/2002 | Hsu et al. |
| 7,059,684 | B1 | 6/2006 | Polka |
| 7,677,677 | B1 | 3/2010 | Roberts |
| 2007/0102994 | A1 | 5/2007 | Wright et al. |
| 2010/0026082 | A1 | 2/2010 | Liffick |

*Primary Examiner* — Richard Chang
(74) *Attorney, Agent, or Firm* — Wyatt, Tarrant & Combs, LLP; Matthew A. Williams

(57) ABSTRACT

A wheel trim adapter adapted to be securely affixed to the wheel of a vehicle without the use of tools, wherein the adapter can be used in a system for affixing a wheel trim or wheel cover to said vehicle, and methods for using same.

13 Claims, 4 Drawing Sheets

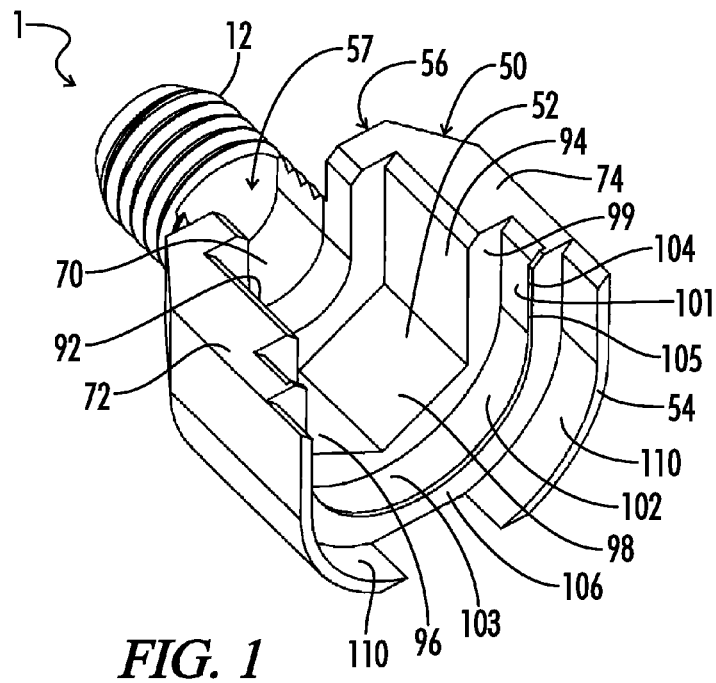
*FIG. 1*
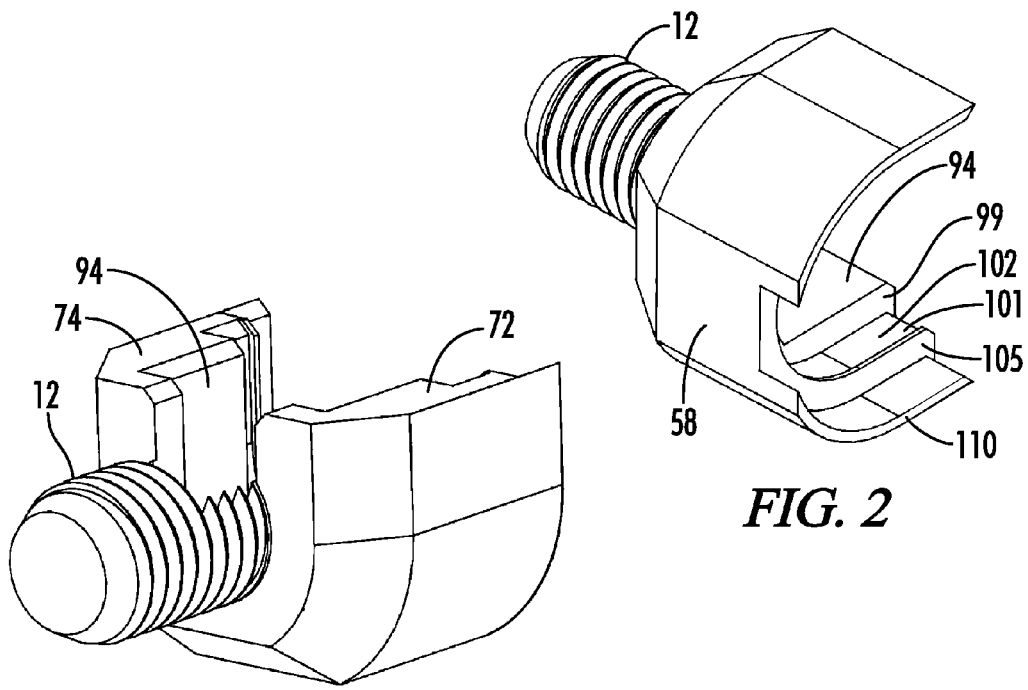
*FIG. 2*
*FIG. 3*

WHEEL TRIM ADAPTER

CROSS-REFERENCE TO RELATED APPLICATIONS

Not Applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to an adapter suitable for affixing wheel covers and wheel trim to the wheels of a vehicle, and more specifically to an adapter that can be installed without removing or loosening pre-installed lug nuts and without the use of tools.

2. General Background of the Invention

The instant invention provides an adapter and method for affixing a wheel cover or wheel trim (collectively referred to as "wheel trim") to the wheel of a vehicle.

Various apparatuses have been developed for the connection of a wheel trim to the wheel of the vehicle including adapters that require the removal of one or more lug nuts of the vehicle and adapters that can be installed without the removal of a vehicle's lug nuts. Known apparatuses of this latter category fall generally into one of three types. The apparatus disclosed in U.S. Pat. No. 6,485,107, which is incorporated herein by reference, exemplifies the first of these types. This patent discloses an adapter is screwed onto a portion of a vehicle's wheel stud that extend beyond the vehicle's lug nut. Tools must be used to affix such an adapter and such an adapter runs the risk of coming loose if an insufficient amount of threads extend beyond the vehicle's lug nuts.

The second type of known apparatuses depends on a frictional connection between the adapter and the outer periphery of the vehicle's lug nuts. One example of this type is exemplified by U.S. Pat. No. 5,503,465, which is incorporated herein by reference. This patent discloses an adapter that can be clamped around the lug nut using one or more screws to clamp the lug nut to the exterior of the lug nut of a vehicle or the use one of more set screws to engage the adapter to the exterior of a lug nut of the vehicle. Such adapters are prone to failure due to loosening of the screws creating the frictional fit that can occur due to improper installation and/or the vibration and motion of the vehicle. Another example of such a frictional fit device is exemplified by U.S. Pat. No. 5,503,465, which is incorporated herein by reference. This patent discloses the use of a sleeve that is pressed onto the lug nut of the vehicle, depending on friction between the sleeve and the lug nut to hold the adapter in place. Such adapters are prone to failure due resulting from an inexact fit between the sleeve and the lug nut and through the stress relaxation of the sleeve material over time.

The third type, exemplified by U.S. Pat. Nos. 7,059,684 and 7,677,677, which are incorporated herein by reference, clamp around one or more lug nuts of a vehicle using a mechanical fastening means such as screws or spring clips. Such adapters frequently consist of multiple parts that must be assembled correctly, frequently require tools to install, and are prone to failure due to improper assembly or installation.

What is needed then is a wheel trim adapter that permits the installation of the adapter to a vehicle without the use of tools regardless of the type of lug nut utilized, regardless of whether a portion of the vehicle's threaded wheel studs extend past the vehicle's lug nuts, and regardless of whether the vehicle's wheels are affixed to the vehicle using lug bolts.

SUMMARY OF THE INVENTION

The present invention relates to a wheel trim adapter adapted to facilitate the interconnection of a wheel trim to a vehicle comprising a body portion, said body portion having a plurality of internal walls, said plurality of internal walls defining a cavity within said body portion, said plurality of internal walls including a first pair of said plurality of internal walls are parallel and cooperate to define an opening in said body portion sized to enable said wheel trim adapter to slide laterally onto a lug nut installed on a wheel of said vehicle, said parallel walls being spaced to prevent rotation of said wheel trim adapter about said lug nut and one or more terminal walls interconnecting the end portions of said parallel walls opposite the opening defined in the side portion of the body portion and a retention ledge extending inward from a bottom portion of said body portion, said retention ledge being sized to slide between a portion of said lug nut and said wheel.

BRIEF DESCRIPTION OF THE DRAWINGS

For a further understanding of the nature, objects, and advantages of the present invention, reference should be had to the following detailed description, read in conjunction with the attached figures, wherein like reference numerals denote like elements and wherein:

FIG. 1—Perspective illustration of an embodiment of the invention adapted for use with a hub-pilot type lug nut.

FIG. 2—Alternate perspective view of the embodiment of the invention illustrated in FIG. 1.

FIG. 3—Alternate perspective view of the embodiment of the invention illustrated in FIG. 1.

DETAILED DESCRIPTION OF THE INVENTION

Figure 4:
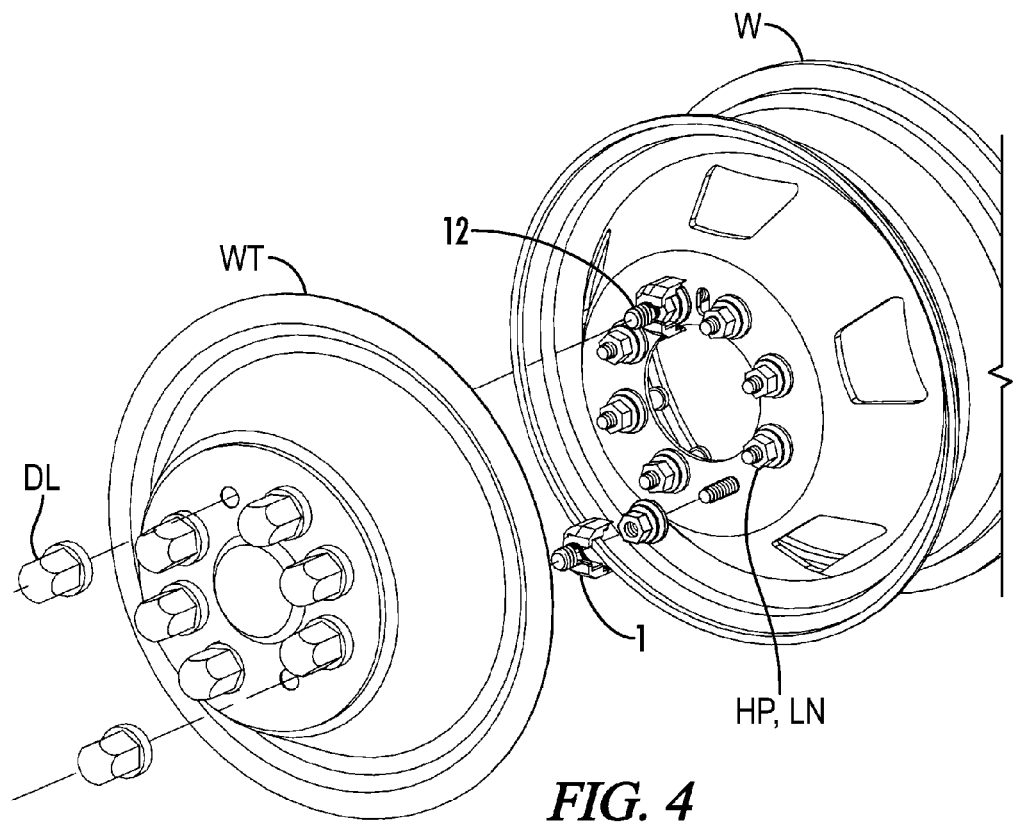
FIG. 4—Exploded perspective view showing an illustration of the embodiment of the invention illustrated in FIG. 1 in use to attach a wheel trim to a vehicle.

The present invention is wheel trim adapter 1. Wheel trim adapter 1 is adapted to facilitate the attachment of a wheel cover or wheel trim (hereinafter collectively referred to as wheel trim WT) to a wheel W of a vehicle. Wheel trim adapter 1 is further adapted to be affixed to the wheel W of a vehicle without the use of tools by slipping onto the existing lug nut (regardless of whether it is a hub-pilot lug nut HP or a stud pilot lug nut SP) in such a way that wheel trim adapter 1 will not rotate relative to the lug nut and that wheel trim adapter 1 cannot be removed by applying a force that is coexistent with or parallel to the longitudinal axis of the wheel stud WS to which lug nut LN is affixed (i.e. perpendicular to wheel W).

In the embodiment illustrated in FIGS. 1-5, wheel trim adapter 1 comprises body 50. Body 50 generally defines cavity 52 that is accessible from bottom 54 of body 50, through slot 57 defined in top 56 of body 50, and through mating opening 70 defined in a side portion of body 50 by vertical sides 72 and 74. To minimize material, the outer surface of body 50 is generally cylindrical in nature as it extends from vertical side 72 that defines a first side of mating opening 70 to vertical side 74 that defines a second side of mating opening 70. To further minimize the material used in forming wheel trim adapter 1, side 58 of body 50, which is opposed to mating opening 70, can be flattened as illustrated in FIG. 2.

Figure 5:
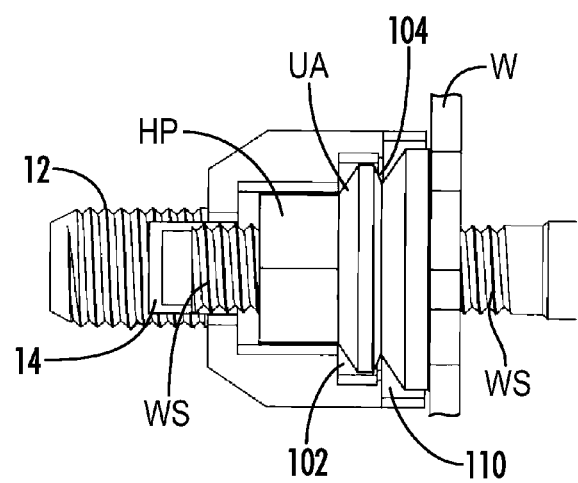
FIG. 5—Illustration showing the embodiment of the invention from FIG. 1 mated to a hub-pilot type lug nut.

In the embodiment illustrated in FIG. 1, cavity 52 defined in body 50 is provided with a specific shape to enable wheel trim adapter 1 to be mated to a hub-pilot type lug nut HP of the type illustrated in FIG. 5 without having to remove or replace an existing hub-pilot lug nut HP from wheel stud WS and without the use of tools. Once mated with hub-pilot lug nut HP, wheel trim adapter 1 will not rotate about hub-pilot lug nut HP and cannot be removed by applying a force coexistent with or parallel to the longitudinal axis of the wheel stud WS to which hub-pilot lug nut HP is affixed.

The mating of wheel trim adapter 1 to hub-pilot lug nut HP such that wheel trim adapter 1 will not rotate about hub-pilot lug nut HP is achieved through the configuration of a plurality of internal walls including, in the illustrated embodiment, parallel walls 92 and 94 and one or more terminal walls. Parallel walls 92 and 94 respectively extend inward from portions of vertical sides 72 and 74 that define mating opening 70. Parallel walls 92 and 94 are spaced apart to receive opposing flat sides F1 and F2 of hub-pilot lug nut HP in such a way that adapter 1 cannot rotate about hub-pilot lug nut HP. Parallel walls 92 and 94 are preferably longer than the flat sides of hub-pilot lug nut HP to reduce the possibility of wheel trim adapter 1 slipping off hub-pilot lug nut HP.

Wheel trim adapter 1 therefore must be mated with hub-pilot lug nut HP such that parallel internal walls 92 and 94 are generally parallel to opposing flat sides and of hub-pilot lug nut HP. One or more terminal walls connect the internal ends of parallel walls 92, 94, to form an enclosed cavity. In the illustrated embodiment, two terminal walls 96 and 98 respectively extend from the internal end of parallel walls 92 and 94 at the same angle as between intersecting flat sides of hub-pilot lug nut HP. Slot 57 is defined in top 56 of body 50 to provide clearance for any portion of wheel stud WS that extends beyond hub-pilot lug nut HP.

The bottom portion of walls 92, 94, 96, and 98 cooperate to form flat surface 99 that extends radially outward from the center of body 50 to further define cavity 52. Cavity 52 is still further defined by apron-retaining wall 102 extending downward from the radially outward portion of flat 99. Apron-retaining wall 102 further comprises opposing, parallel portions 101 extending perpendicularly from vertical sides 72 and 74 into body 50 that are connected by semi-circular portion 103. Semi-circular portion 103 of apron-retaining wall 102 has a diameter larger than the diameter of upper apron UA of hub-pilot lug nut HP.

Extending inward from the lower edge portion of apron-retaining wall 102 is retention ledge 104. Similar to wall 102, retention ledge 104 comprises opposing, parallel portions 105 that extend perpendicularly from vertical sides 72 and 74 into body 50 and are connected by semi-circular portion 106. Semicircular portion 106 of retention ledge 104 has a diameter less than the diameter of upper apron UA of hub-pilot lug nut HP. Retention ledge 104 cooperates with apron-retaining wall 102 and flat 99 to form a channel for receiving upper apron UA of hub-pilot lug nut HP. Retention ledge 104 additionally resists efforts to remove wheel trim adapter 1 in the direction of the longitudinal axis of the wheel stud WS to which hub-pilot lug nut HP is affixed by impinging on upper apron UA of hub-pilot lug nut HP.

In the embodiment illustrated in FIGS. 1-5, wheel trim adapter 1 further includes optional skirt 110. Skirt 110 extends downward from retention ledge 104 the distance required to align retention ledge 104 to slide just under upper apron UA of hub-pilot lug nut HP. Skirt 110 therefore facilitates alignment of wheel trim adapter 1 for mating with hub-pilot lug nut HP by enabling the user to simply rest wheel trim adapter 1 on wheel W and slide wheel trim adapter 1 onto hub-pilot lug nut HP. To further facilitate the alignment of wheel trim adapter 1 with hub-pilot lug nut HP, skirt 110 may be provided in two portions as illustrated in FIGS. 1-4. This provides an opening on the opposite side of wheel trim adapter 1 from mating opening 70 through which the user can view hub-pilot lug nut HP from the side of wheel trim adapter 1 opposite mating opening 70. Alternatively, skirt 110 can be omitted from wheel trim adapter 1 without affecting the function of wheel trim adapter 1.

Figure 6:
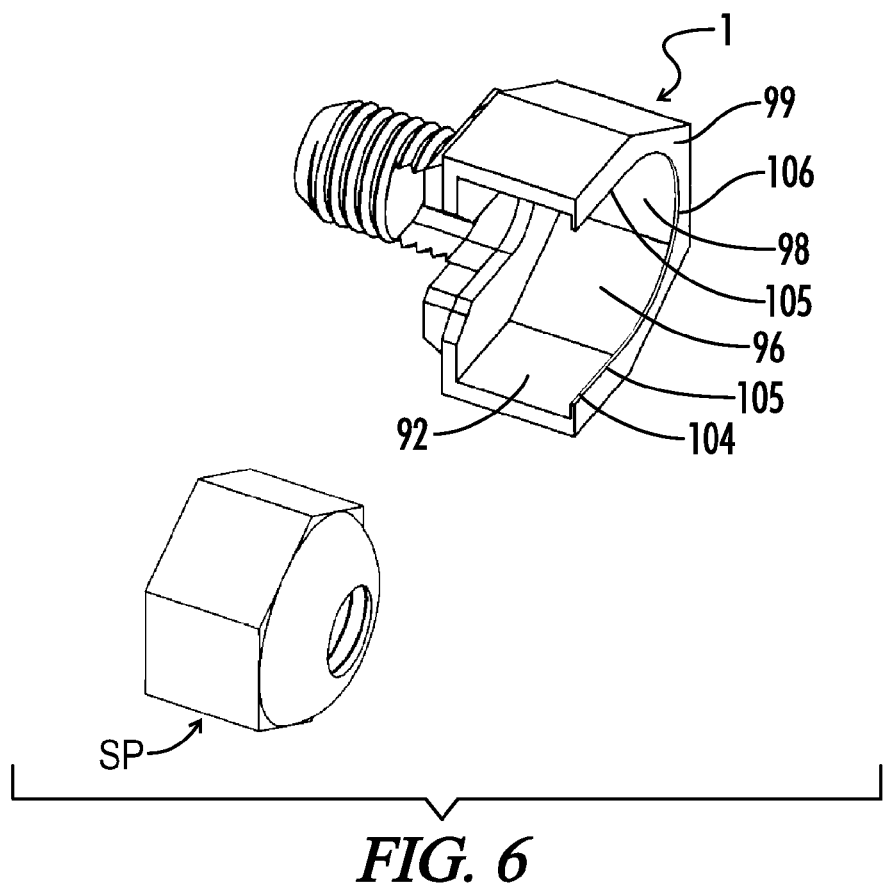
FIG. 6—Perspective illustration of an embodiment of the invention adapted for use with a stud pilot type lug nut.
Figure 7:
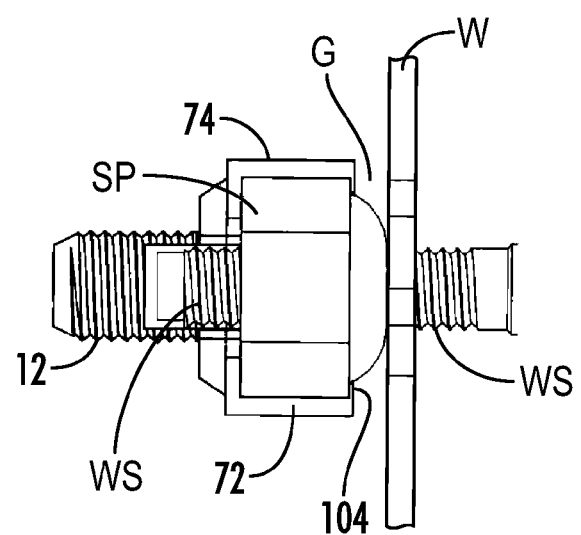
FIG. 7—Illustration showing the embodiment of the invention from FIG. 1 mated to a stud pilot lug nut.

Shown in FIGS. 6-7 is an alternate embodiment of wheel trim adapter 1 adapted for use in connection with stud pilot lug nut SP, which comprises a nut having a rounded or conical end that mates against a vehicle's wheel W. To adapt wheel trim adapter 1 for use with stud pilot lug nut SP, skirt 110 and apron-retaining wall 102 are omitted from body 50. Thus, internal walls 92, 94, 96, and 98 cooperate to prevent the rotation of wheel trim adapter 1 about stud pilot lug nut SP as described above with respect to use of wheel trim adapter 1 with hub-pilot lug nut HP. In this embodiment, retention ledge 104 extends inward from flat 99 and comprises parallel portions 105 that extend perpendicularly from vertical sides 72 and 74 and are connected by semi-circular portion 106. In this embodiment, retention ledge 104 has sufficient depth to extend into gap G between the bottom portion BP of stud pilot lug nut SP and wheel W resulting from the mating of the rounded or conical end of stud pilot lug nut SP against wheel W, thereby partially encircling stud pilot lug nut SP. Retention ledge 104 thereby resists any effort to remove wheel trim adapter 1 in the direction of the longitudinal axis of the wheel stud WS to which stud pilot lug nut SP is affixed.

Figure 9:
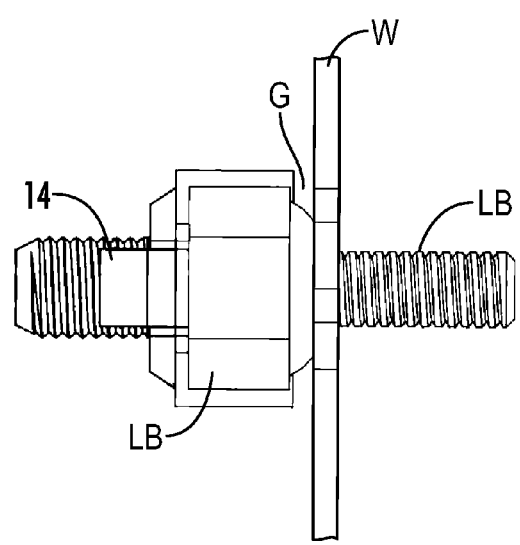
FIG. 9—Illustration showing the embodiment shown in FIG. 6 mated to a lug bolt.

Referring now to FIG. 9, in some vehicles the wheels W are affixed to the vehicle using a lug bolt LB that is received into threaded openings provided in the vehicle hub to which each wheel W is affixed. Each lug bolt LB typically comprises a head portion having the configuration of stud pilot lug nut SP except for the threaded central aperture. Instead, a threaded portion extends from the rounded or conical portion of the headed portion, creating a gap G similar to the one created when a stud pilot lug nut SP is used to affix wheel W to the vehicle. Accordingly, when such a lug bolt is used to affix wheel W to a vehicle, wheel trim adapter 1 adapted to be used with stud pilot lug nut SP can be used to affix wheel trim WT.

Figure 8:
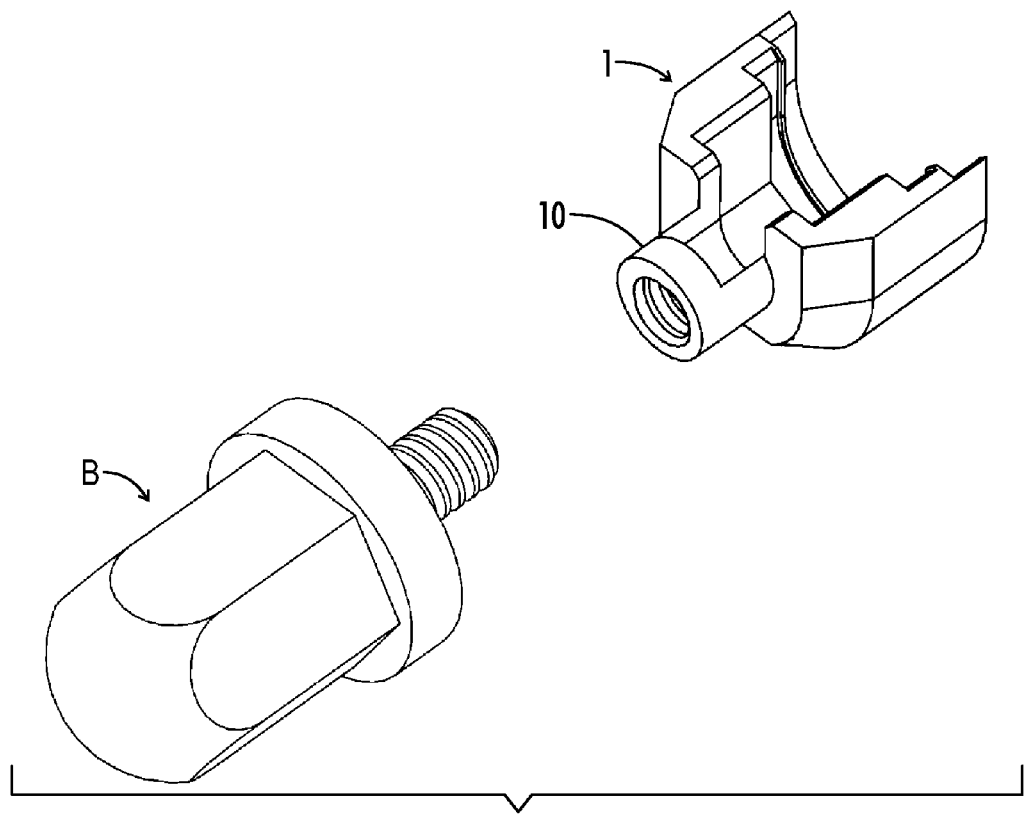
FIG. 8—Illustration showing an alternate embodiment of the invention.

Regardless of whether body 50 of wheel trim adapter 1 is adapted for use with a hub-pilot lug nut HP or a stud pilot lug nut SP, extending from the upper portion of body 50 is trim-mounting portion 10. In the illustrated embodiments, trim-mounting portion 10 further comprises threaded stud 12. The lower portion of threaded stud 12 closest to body 50 is provided with recess 14 in alignment with slot 57 in body 50. Recess 14 is provided to allow additional clearance for wheel stud WS. Threaded stud 12 is sized to be received by wheel trim WT to be installed on the vehicle and is used to affix wheel trim WT to wheel trim adapter 1 using decorative lug DL having threads T that are compatible with threaded stud 12. It should be observed that the diameter of threaded stud 12 is selected based on the needs of the wheel trim WT to be installed using wheel trim adapter 1. It should be noted that trim mounting portion 10 could also comprise a female-threaded portion, thereby enabling wheel trim WT to be affixed to using a male-threaded bolt B (FIG. 8). Trim mounting portion 10 could also be adapted for use with other known techniques for affixing one item to another.

To install wheel trim WT, one or more wheel trim adapters 1 are affixed to the same number of lug nuts installed on a vehicle to prepare the vehicle to receive wheel trim WT. As shown in FIG. 4, wheel trim adapters 1 may be used in pairs to enable wheel trim WT to be secured to wheel W of a vehicle. This is done by mating a first wheel trim adapter 1 of the pair of wheel trim adapters 1 to a first lug nut HP installed on a vehicle. Wheel trim adapter 1 may be installed with mating opening 70 facing generally downward such that gravity will hold wheel trim adapter 1 in place until wheel trim WT is installed. The second wheel trim adapter 1 is then installed on second lug nut HP (in FIG. 4, a hub-pilot lug nuts HP are shown but the use of wheel trim adapters 1 with stud pilot lug nuts SP is essentially the same) that is preferably located directly opposite first lug nut HP in a typical six lug nut pattern or any other pattern that involves the use of an even number of lug nuts. In lug nut patterns consisting of an odd number of lug nuts, wheel trim adapters 1 are preferably installed on lug nuts that are as close to being opposite as is possible with such an odd number of lug nuts. More than two wheel trim adapters 1 can be used as needed to securely affix wheel trim WT.

Once the required number of wheel trim adapters 1 are installed on the vehicle, wheel trim WT is then affixed to wheel trim adapters 1 by sliding wheel trim WT over the trim-mounting portion 10 of each wheel trim adapter 1. In the embodiment illustrated in FIG. 4, wheel trim WT is then affixed to threaded stud 12 of each wheel trim adapter 1 using decorative lugs DL having threads T that are compatible with threaded stud 12.

Where installation involves the use of two or more wheel trim adapters 1 as shown in FIG. 4, this installation method results in the wheel trim WT being securely fastened to wheel W. First, no wheel trim adapter 1 installed in this manner can rotate about lug nut HP and cause decorative lug DL to loosen with respect to threaded stud 12 since the configuration of internal walls 92, 94, 96, and 98 precludes such rotation. Second, retention ledge 104 prevents wheel trim adapters 1 from being removed from wheel in a direction of the longitudinal axis of the wheel stud WS so wheel trim WT cannot be removed perpendicularly from wheel W. Finally, the interconnection of wheel trim adapters 1 using wheel trim WT prevents wheel trim adapters 1 from sliding off lug nuts LN or being flung radially away from lug nuts LN through the rotation of wheel W.

The foregoing described embodiments are exemplary in nature and are not intended to limit the scope of the invention.

We claim:

1. A wheel trim adapter comprising:
   a body portion, said body portion having
      a plurality of internal walls, said plurality of internal walls defining a cavity within said body portion, said plurality of internal walls including
         a pair of parallel internal walls that cooperate to define an opening in said body portion sized to enable said wheel trim adapter to slide laterally onto a lug nut installed on a wheel of a vehicle, said parallel walls being spaced to prevent rotation of said wheel trim adapter about said lug nut and
         one or more terminal walls interconnecting the end portions of said parallel walls opposite the opening defined in a side portion of the body portion and
         a retention ledge extending inward from a bottom portion of said body portion, said retention ledge being sized to slide between a portion of said lug nut and said wheel.

2. The wheel trim adapter of claim 1 wherein said one or more terminal walls further comprises two terminal walls, wherein each terminal wall is connected to the other at a first end portion and a second end portion of each terminal wall is connected to an end portion of one of said parallel internal walls.

3. The wheel trim adapter of claim 1 further comprising a trim mounting portion, said trim mounting portion being interconnected with said body portion such that said trim mounting portion extends away from said vehicle when said wheel trim adapter is installed on said vehicle.

4. The wheel trim adapter of claim 3 wherein said trim mounting portion further comprises a threaded rod.

5. The wheel trim adapter of claim 3 wherein said trim mounting portion further comprises a female-threaded aperture.

6. A wheel trim adapter comprising:
   a body portion, said body portion having
      a pair of parallel walls, said pair of parallel walls cooperating to define an opening in a side of the body portion and said pair of parallel walls spaced apart to slide laterally onto a hub-pilot lug nut installed on a vehicle, said pair of parallel walls being spaced to prevent rotation of said wheel trim adapter about said hub-pilot lug nut,
      one or more terminal walls interconnecting the end portions of said parallel walls opposite the opening defined in the side portion of the body portion, such that said pair of parallel walls and said one or more terminal walls form a cavity for receiving a nut portion of the hub-pilot lug nut;
      a flat surface extending outward from a bottom portion of said walls;
      an apron-retaining wall extending downward from an outward portion of said flat surface;
      a retention ledge extending inward from said apron-retaining wall such that said flat surface, said apron-retaining wall, and said retention ledge cooperate to form an extension of the cavity defined by the pair of parallel walls and said one or more terminal walls,
      wherein the extension of said cavity is sized to receive an upper apron portion of the hub pilot lug nut and said retention ledge is sized to slide under the upper apron portion of said lug nut.

7. The wheel trim adapter of claim 6 wherein said one or more terminal walls further comprises a pair of terminal walls, wherein each of said pair of terminal walls is connected to the other at a first end portion and a second end portion of each of said pair of terminal walls is connected to an end portion of one of said pair of parallel internal walls.

8. The wheel trim adapter of claim 6 further comprising a skirt, said skirt extending downward from a portion of the outer perimeter of a bottom surface of the body portion.

9. The wheel trim adapter of claim 8 wherein the skirt is separated into two portions, the two portions of the skirt defining an open space on the side of the body portion opposite the opening defined by the pair of parallel walls.

10. The wheel trim adapter of claim 6 further comprising a trim mounting portion, said trim mounting portion being interconnected with said body portion such that said trim mounting portion extends away from said vehicle when said wheel trim adapter is installed on said vehicle.

11. The wheel trim adapter of claim 10 wherein said trim mounting portion further comprises a threaded rod.

12. The wheel trim adapter of claim 10 wherein said trim mounting portion further comprises a female-threaded aperture.

13. A method for installing a wheel trim to a wheel of a vehicle comprising:
- installing a plurality of wheel trim adapters to an identical plurality of lug nuts affixing said wheel to the vehicle, each of said plurality of wheel trim adapters comprising a body portion having
    - a plurality of internal walls cooperating to define an internal cavity, said plurality of internal walls being arranged to enable said wheel trim adapter to slide laterally onto said pre-installed lug nut such that said internal walls prevent said wheel trim adapter from rotating about said pre-installed lug nut,
    - a retention ledge extending from a bottom portion of each of said plurality of internal walls such that said retention ledge engages a portion of said pre-installed lug nut facing said wheel, and
    - a wheel trim mounting portion;
- connecting a wheel trim to the wheel trim mounting portion of each of said plurality of wheel trim adapters.

\* \* \* \* \*